United States Patent
Kuzdeba et al.

(10) Patent No.: US 11,808,882 B2
(45) Date of Patent: Nov. 7, 2023

(54) RADAR ELECTRONIC COUNTERMEASURES WITHOUT A THREAT DATABASE

(71) Applicant: BAE SYSTEMS Information and Electronic Systems Integration Inc., Nashua, NH (US)

(72) Inventors: Scott A Kuzdeba, Hollis, NH (US); Matthew Anderson, Mont Vernon, NH (US); Brandon P. Hombs, Merrimack, NH (US); Daniel Massar, Bedford, NH (US); John A. Tranquilli, Jr., Amherst, NH (US)

(73) Assignee: BAE Systems Information and Electronic Systems Integration Inc., Nashua, NH (US)

( * ) Notice: Subject to any disclaimer, the term of this patent is extended or adjusted under 35 U.S.C. 154(b) by 279 days.

(21) Appl. No.: 16/953,659

(22) Filed: Nov. 20, 2020

(65) Prior Publication Data

US 2022/0163629 A1    May 26, 2022

(51) Int. Cl.
*G01S 7/36* (2006.01)
*G01S 7/38* (2006.01)
*G01S 7/02* (2006.01)

(52) U.S. Cl.
CPC .............. *G01S 7/36* (2013.01); *G01S 7/021* (2013.01); *G01S 7/38* (2013.01)

(58) Field of Classification Search
CPC .............. G01S 7/021; G01S 7/36; G01S 7/38
USPC ...................................................... 342/16, 13
See application file for complete search history.

(56) References Cited

U.S. PATENT DOCUMENTS

| | | | |
|---|---|---|---|
| 4,990,920 A | 2/1991 | Sanders, Jr. | |
| 5,061,930 A | 10/1991 | Nathanson | |
| 5,150,122 A * | 9/1992 | Bell | H01Q 15/18 |
| | | | 342/13 |
| 5,287,110 A | 2/1994 | Tran | |

(Continued)

FOREIGN PATENT DOCUMENTS

| | | | | |
|---|---|---|---|---|
| CN | 110109059 | * | 9/2019 | ............... G01S 7/38 |
| CN | 111366899 A | | 7/2020 | |
| EP | 1291667 A2 | | 3/2003 | |

OTHER PUBLICATIONS

Classification, Denoising, and Deinterleaving of Pulse Streams with Recurrent Neural Networks by Zhang-Meng Liu published by IEEE Aug. 2019 (Year: 2019).*

(Continued)

*Primary Examiner* — Vladimir Magloire
*Assistant Examiner* — Michael W Justice
(74) *Attorney, Agent, or Firm* — Maine Cernota & Curran; Gary McFaline

(57) ABSTRACT

A closed loop, real-time, cognitive Electronic Warfare (EW) system without a threat database includes an EW receiver for receiving radar threat signals; a Signal Analysis and Characterization module; a Pulse to Emitter Association sub-module; a Function De-interleaving Classifier sub-module; a Threat Behavior Model sub-module; a Countermeasures Synthesis module; a Capability, Severity, and Intent sub-module; a Countermeasure Selection sub-module; a Countermeasure Optimization sub-module; a Countermeasures Effectiveness Assessment module; a Resource Management module; and an EW transmitter.

16 Claims, 6 Drawing Sheets

ARC EW PROCESSING CHAIN INCORPORATING CONVENTIONAL INPUT

(56) References Cited

U.S. PATENT DOCUMENTS

| | | | | |
|---|---|---|---|---|
| 5,448,243 | A | * | 9/1995 | Bethke ............... G01S 13/87 |
| | | | | 342/36 |
| 5,457,460 | A | | 10/1995 | Tran |
| 5,574,458 | A | * | 11/1996 | Tran ................. G01S 7/38 |
| | | | | 342/13 |
| 5,606,500 | A | * | 2/1997 | Tran ................. G01S 7/36 |
| | | | | 701/1 |
| 6,181,744 | B1 | | 1/2001 | Antonaitis |
| 6,788,243 | B2 | * | 9/2004 | Lavoie ............... G01S 7/021 |
| | | | | 342/13 |
| 7,068,209 | B2 | | 6/2006 | Gounalis |
| 7,737,883 | B2 | * | 6/2010 | Dark ................. H04K 3/45 |
| | | | | 342/13 |
| 7,830,297 | B1 | * | 11/2010 | Wang ................ G01S 7/021 |
| | | | | 342/13 |
| 8,082,832 | B1 | | 12/2011 | Tidwell |
| 8,587,468 | B2 | * | 11/2013 | Card ................. G01S 7/42 |
| | | | | 342/13 |
| 9,322,907 | B1 | * | 4/2016 | Kadambe ........... G06N 20/00 |
| 9,519,049 | B1 | * | 12/2016 | Kadambe ........... G01S 7/02 |
| 10,281,570 | B2 | | 5/2019 | Parker |
| 10,365,348 | B2 | * | 7/2019 | Markel .............. G01S 7/021 |
| 10,630,712 | B2 | * | 4/2020 | Amor ................ B64D 43/00 |
| 10,800,392 | B2 | * | 10/2020 | Alam ................ B60T 17/22 |
| 10,907,940 | B1 | | 2/2021 | Parker |
| 10,908,252 | B2 | * | 2/2021 | Grandin ............. G01S 7/292 |
| 10,924,308 | B1 | * | 2/2021 | Crawford .......... H04B 1/16 |
| 11,032,022 | B1 | * | 6/2021 | Sen .................. H04W 12/122 |
| 11,181,346 | B1 | * | 11/2021 | Barfoot ............. F41G 7/2246 |
| 2010/0253567 | A1 | | 10/2010 | Factor |
| 2011/0148699 | A1 | | 6/2011 | Anderson |
| 2016/0107643 | A1 | * | 4/2016 | Mizutani ........... G06V 20/58 |
| | | | | 701/519 |
| 2016/0238694 | A1 | | 8/2016 | Kishigami |
| 2017/0160379 | A1 | * | 6/2017 | Markel .............. G01S 7/38 |
| 2017/0192089 | A1 | | 7/2017 | Parker |
| 2017/0293025 | A1 | * | 10/2017 | Davis ................ G01S 7/023 |
| 2018/0146003 | A1 | * | 5/2018 | Amor ................ G06F 9/445 |
| 2018/0297573 | A1 | * | 10/2018 | Alam ................ F16D 66/02 |
| 2019/0080187 | A1 | | 3/2019 | Inoue |
| 2019/0162818 | A1 | * | 5/2019 | Grandin ............. G01S 7/021 |
| 2019/0342331 | A1 | * | 11/2019 | Schetina ............ H04L 63/1425 |
| 2020/0153535 | A1 | * | 5/2020 | Jayaweera Kankanamge ............ G06V 10/82 |
| 2020/0166607 | A1 | | 5/2020 | Jolly |
| 2020/0278419 | A1 | * | 9/2020 | Borosak ............. G01S 13/34 |
| 2020/0334961 | A1 | | 10/2020 | Kaindl |
| 2020/0371201 | A1 | | 11/2020 | Ladubec, Jr. |

OTHER PUBLICATIONS

Deinterleaving Radar Pulse Train Using Neural Networks by Alex Erdogan Published IEEE 2019 (Year: 2019).*

Machine Learning by Panos Louridas Publishede by IEEE (Year: 2016).*

CN 111366899AMT.pdf-DES, machine translation of CN-111366899-A (Year: 2020).

Office Action for U.S. Appl. No. 16/953,562 dated Apr. 29, 2022, 22 pages.

Office Action for U.S. Appl. No. 16/953,568 dated May 23, 2022, 38 pages.

Office Action for U.S. Appl. No. 16/953,579 dated Jun. 7, 2022, 37 pages.

Office Action for U.S. Appl. No. 16/953,562 dated Aug. 23, 2022, 32 pages.

Office Action for U.S. Appl. No. 16/953,562, dated Dec. 7, 2022, 30 pages.

Final Office Action for U.S. Appl. No. 16/953,568 dated Oct. 11, 2022, 31 pages.

Final Office Action for U.S. Appl. No. 16/953,579 dated Oct. 26, 2022, 53 pages.

Final Office Action for U.S. Appl. No. 16/953,562 dated Mar. 27, 2023, 31 pages.

Office Action for U.S. Appl. No. 16/953,562 dated Aug. 24, 2023, 26 pages.

Office Action for U.S. Appl. No. 16/953,579 dated Sep. 8, 2023, 57 pages.

* cited by examiner

ARC EW PROCESSING CHAIN INCORPORATING CONVENTIONAL INPUT

200

2A

2B

SAC 135 & EWTM 140 MODULES DETAILS

3A

3B

COUNTERMEASURES SYNTHESIS CMS 145 & ECM ARBITRATION 150
MODULES DETAILS

400

4A

4B

CEA 155 MODULE DETAILS

COGNITIVE EW FUNCTIONAL ARCHITECTURE

COGNITIVE EW METHOD FLOWCHART

RADAR ELECTRONIC COUNTERMEASURES WITHOUT A THREAT DATABASE

STATEMENT OF GOVERNMENT INTEREST

Portions of the present invention may have been made pursuant to Contract Number HR0011-13-C-0029 awarded by DARPA. The United States Government has certain rights in the inventions.

RELATED APPLICATIONS

This application is related to U.S. application Ser. Nos. 16/953,562, 16/953,568, 16/953,579, all of which were filed on Nov. 20, 2020. All of these applications are herein incorporated by reference in their entirety for all purposes.

FIELD

The following disclosure relates generally to radar electronic warfare (EW) countermeasures and, more particularly, to a novel technique for use with radars having some unknown behaviors, covering waveforms that are unknown, ambiguous, or operating differently than expected.

BACKGROUND

Radars are evolving from fixed analog systems to programmable digital variants. As threats continue to evolve and move from analog to digital, their degrees of flexibility are continuously increasing, leading to unknown behaviors and agile waveforms. This creates the ability to rapidly deploy new radar systems or waveforms. These future radars are expected to have the capability of sensing the environment. This will allow them to adapt their operation to maximize performance and mitigate electronic warfare effects. As these radar systems increase their operating complexity, it makes it increasingly difficult for electronic warfare (EW) systems to counter them. This radar flexibility and shorter development cycles pose a problem for current EW system.

Current solutions rely on threat databases to provide countermeasure techniques to use against identified radar systems. These databases are built a priori and loaded into systems prior to operation. As such, they are static and capture a prior belief of what radars will be present and what their capabilities are, but may not actually align with what is present. During operation, identified radar systems are matched to entries within the database to identify which countermeasures to use. No feedback is provided as to whether the countermeasures used were successful.

What is needed is an electronic warfare (EW) device, method, and system to counter the problem of programmable digital radar variants with unknown behaviors, covering waveforms that are unknown, ambiguous, or operating differently than expected.

SUMMARY

An embodiment provides a closed loop real-time cognitive Electronic Warfare (EW) system comprising an EW receiver for receiving radar threat signals from a threat radar and providing raw signal data; a Signal Analysis and Characterization (SAC) module receiving the raw signal data, the SAC module comprising a Pulse to Emitter Association (P2E) sub-module for identifying emitters and isolating pulses for at least one emitter; a Function De-interleaving Classifier (FDC) sub-module that de-interleaves radar function behaviors for the emitter; a Threat Behavior Model (TBM) sub-module tracking changes in radar behaviors; wherein the SAC module outputs a Threat Behavior Model message; a Countermeasures Synthesis (CS) module receiving the Threat Behavior Model message and outputting a CounterMeasure (CM) Strategy message, the CS module comprising a Capability, Severity, and Intent (CSI) sub-module determining a level of threat for each emitter; a Countermeasure Selection (CMS) sub-module selecting one or more electronic countermeasures; a Countermeasure Optimization (CMO) sub-module parameterizing at least one of the electronic countermeasures; a Countermeasures Effectiveness Assessment (CEA) module receiving the Threat Behavior Model message, the CM Strategy message and outputting an Effectiveness Estimate message, the CEA comprising a Resource Management module receiving the CM Strategy message and outputting an Executed Counter-Measure (CM) message comprising an EW transmitter receiving the Executed CM message and transmitting at least one countermeasure to the threat radar. In embodiments the SAC module comprises an EW Track Manager (EWTM) sub-module comprising data-driven machine learning to identify emitters present in an RF environment completely independent of any emitter database. In other embodiments, the Pulse to Emitter Association sub-module comprises data-driven machine learning identifying emitters present in an RF environment and isolating them into pulse streams for each emitter. In subsequent embodiments the Function De-interleaving Classifier sub-module comprises data-driven machine learning de-interleaves radar function behaviors for each emitter and identifies a mode and intent of each completely independent of any emitter database; and the Threat Behavior Modeling sub-module comprises tracking changes in behaviors to enable continual updates to functions of the CS module and the CEA module. For additional embodiments an EW Track Manager (EWTM) module comprises fusing SAC emitter tracks with conventional EW ESM emitter tracks to identify and merge War Reserve Modes (WRM) for known emitters, splitting baseline clustered tracks, and completing mode and intent characterization for unknown tracks and waveforms. In another embodiment the Countermeasures Synthesis CS module comprises using a characterization from the SAC and a data-driven machine learning algorithm. For a following embodiment the Countermeasures Synthesis CS module comprises using a characterization from the SAC module and a data-driven machine learning algorithm fed from the CEA module. In subsequent embodiments the Countermeasure Selection sub-module comprises a characterization from the SAC and a data-driven machine learning algorithm to select at least one best Electronic Countermeasure (ECM) to apply to each emitter. In additional embodiments the Capability, Severity, and Intent sub-module comprises determining a level of threat for each emitter to decide upon jamming responses. In included embodiments, ECM arbitration modules comprise mitigation and resolving ECM differences between a conventional ECM system and the Cognitive EW System from the Countermeasures Synthesis CS. In yet further embodiments the Countermeasures Synthesis CS module comprises the countermeasure optimization sub-module wherein ECM is parameterized based on observed threat behaviors. In related embodiments the CEA module comprises comparing at least one observable threat response to expected responses from employed at least one the ECM to compute an estimate of ECM effectiveness. For further embodiments the CEA module comprises comparing at least one observable threat response to expected responses from employed at least one the ECM to compute an estimate of ECM effectiveness is through continued operation of the SAC module. In ensuing embodiments the CEA module comprises providing feedback to the Countermeasures Synthesis CS module to enable adaptive radar countermeasures.

Another embodiment provides a method for closed loop real-time cognitive Electronic Warfare (EW) comprising receiving a signal from a threat radar by an EW receiver; receiving raw signal data at a Signal Analysis and Characterization (SAC) module; outputting a Threat Behavior Model message from the SAC module; receiving the Threat Behavior Model message at a Countermeasures Synthesis (CS) module; receiving the threat behavior message at a Countermeasures Effectiveness Assessment (CEA) module; outputting an Effectiveness Estimate message from the CEA module; receiving the Effectiveness Estimate message at the CS module; outputting a CM Strategy message from the CS module; receiving the CM Strategy message at a Resource Management module; outputting an Executed Counter Measures (CM) message from the Resource Management module; receiving the Executed CM message at the CEA module; sending the Executed CM message to an EW transmitter; and transmitting countermeasures back to the threat radar. For yet further embodiments, the method comprises a Function De-interleaving Classifier (FDC) sub-module wherein data-driven machine learning de-interleaves radar functions for each emitter completely independent of any emitter database. For more embodiments the method comprises a Function De-interleaving Classifier (FDC) sub-module wherein data-driven machine learning identifies a mode and intent of each emitter completely independent of any emitter database. Continued embodiments include a Threat Behavior Model sub-module wherein it tracks changes in behaviors to enable continual updates to CS and CEA functions by outputting a Behavior Module Threat messenger. For additional embodiments the method comprises a Countermeasure Selection sub-module comprising a characterization from the SAC and a data-driven machine learning algorithm to select at least one best Electronic Countermeasure (ECM) to apply to each emitter.

A yet further embodiment provides a cognitive Electronic Warfare (EW) processing system comprising a legacy database driven open-loop path; a Cognitive EW closed-loop processing path; a pulse detection input provided to the legacy path and the Cognitive EW path; in the legacy path, an Electronic Support Measures (ESM) system; in the legacy path, a radar tracks output from the ESM system to Platform Systems and/or to an EW Track Manager (EWTM) sub-module; in the legacy path, an ECM Technique Lookup system; in the legacy path, an ECM output from the ECM Technique Lookup system is sent to the Platform Systems and/or an ECM Arbitration module; in the legacy path, the ESM system and the ECM technique lookup receives input from an Emitter Database (EDB); in the Cognitive EW closed-loop processing, a Signal Analysis & Characterization (SAC) module receives the pulse detection; in the Cognitive EW closed-loop processing, SAC output is input to the EW Track Manager (EWTM) sub-module; in the Cognitive EW closed-loop processing, the legacy ESM system also provides input to the EWTM sub-module; in the Cognitive EW closed-loop processing, EWTM sub-module output is input to an Countermeasure Synthesis (CS) module; in the Cognitive EW closed-loop processing, CS output is input to the ECM Arbitration module; in the Cognitive EW closed-loop processing, the ECM Technique Lookup also provides input to the ECM Arbitration; in the Cognitive EW closed-loop processing, ECM Arbitration output is input to a Countermeasure Effectiveness Assessment (CEA) module; in the Cognitive EW closed-loop processing, the SAC also provides input to the CEA; the SAC, the CS, and the CEA provide input to a Cognitive EW storage; in the Cognitive EW closed-loop processing, the CS and the CEA provide input to Platform Systems; in the Cognitive EW closed-loop processing, the CEA also provides input to the CS; the Platform Systems also provide input to the ETWM and the ECM Arbitration; and a report output for performance analysis and debugging.

These and other features of the present embodiments will be understood better by reading the following detailed description, taken together with the figures herein described. The accompanying drawings are not intended to be drawn to scale. For purposes of clarity, not every component may be labeled in every drawing.

DETAILED DESCRIPTION

The features and advantages described herein are not all-inclusive and, in particular, many additional features and advantages will be apparent to one of ordinary skill in the art in view of the drawings, specification, and claims. Moreover, it should be noted that the language used in the specification has been selected principally for readability and instructional purposes, and not to limit in any way the scope of the inventive subject matter. The invention is susceptible of many embodiments. What follows is illustrative, but not exhaustive, of the scope of the invention.

Embodiments approach the problem of programmable digital radar variants with unknown behaviors and agile waveforms differently from current solutions relying on threat databases to provide countermeasure techniques to use against identified radar systems.

Embodiments select how to counter a radar based on observations from what is actually seen, without the need to lookup a specific technique. This is better than existing systems in covering waveforms that are unknown, ambiguous, or operating differently than expected. Further, embodiments also provide real-time monitoring of the used Electronic Counter Measures (ECM) against the radar to determine effectiveness. This provides the ability to update the strategy and adapt the ECM in order to improve effectiveness and defeat the radar, a capability that does not exist today. This adds up to a full system benefit over existing systems that it is capable of providing a closed loop real-time system that determines how to use ECMs and their estimated effectiveness in order to defeat a radar system. The ECM systems can be deployed, for example, on various fixed and mobile assets such as air, space, maritime and ground vehicles.

Embodiments address the problem of programmable digital radar variants with unknown behaviors, covering waveforms that are unknown, ambiguous, or operating differently than expected with a system that can learn on-the-fly how to counter unknown radars or waveform waveforms. Embodiments of the EW system provide the capability to construct electronic countermeasures (ECM) against threatening radars, assess ECM effectiveness in real-time, and adapt the ECM strategy as needed to defeat the radars. This is all done in the absence of a threat database, instead relying on building an understanding from over-the-air waveform observables to determine how to counter a threatening radar, and importantly, if it is being successful in doing so.

Figure 1:
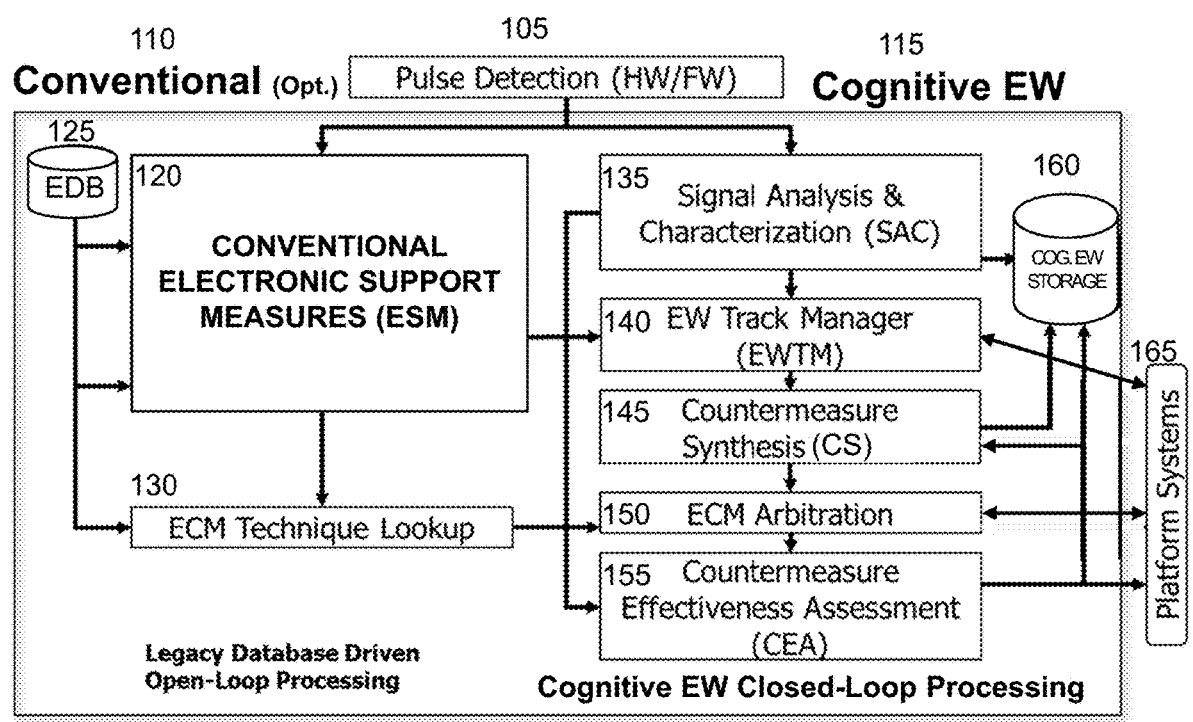
FIG. 1 depicts a Cognitive Electronic Warfare (EW) Processing Chain configured in accordance with an embodiment.

FIG. 1 depicts a Cognitive EW processing chain 100 incorporating optional conventional input 110 as part of the EW receiver system wherein the EW receiver is used within the Electronic Support Measures (ESM) equipment and functions as a sensor for, and as a means of identifying, friendly, neutral, and enemy electronic emissions. It provides warning of potential attack, knowledge of enemy capabilities, and an indication of enemy use of active countermeasures to manipulate the electromagnetic spectrum. The electronic warfare receiver in one example can cover the entire range of the electromagnetic spectrum with components designed to provide maximum efficiency over a frequency range.

Pulse detection (HW/FW) input 105 is provided to both conventional legacy database driven open-loop processing 110 and Cognitive EW closed-loop processing 115 paths. Addition of the conventional system is optional, i.e. the Cognitive EW system will operate without it (FIG. 5), but can also operate in tandem. In the conventional legacy path 110, traditional Electronic Support Measures (ESM) 120 process the received pulse detection 105 and output radar tracks. ESM in general analyze the RF spectrum for emissions to exploit the weapons or sensors involved. Exploitation includes tactical early warning, identification for counter weapon selection and recording to support countermeasures development. As an example, automatic tracking radars lock onto a target by positioning the range at the target and use the radar return to approximate the range of the designated target. This information can be used in the ECM to provide false target range information.

ESM processing 120 involves input from an emitter database (EDB) 125 which contains IDs for known emitters and waveforms. ESM 120 outputs identified radar tracks to ECM Technique Lookup 130 to determine preselected ECM for the identified radar track. ECM Technique Lookup 130 also involves input from the emitter database 125. The emitter database provides the definition of the ECM technique to deploy against the database matched radar track. In the Cognitive EW closed-loop processing 115, Signal Analysis & Characterization (SAC) 135 receives pulse detection 105 and performs emitter and waveform characterization in the absence of an emitter database, thus provided the same functionality as the conventional ESM path, but for those radars or waveforms that are not present in the database, have a high degree of ambiguity, or otherwise need a secondary assessment. SAC 135 output is input to EW Track Manager (EWTM) 140. The EWTM merges the ESM and SAC identification of radars and waveforms into a single view of what is happening in the scene, including addressing any conflicts between the two. ESM 120 also provides input to EWTM 140. EWTM 140 is a sub-module within SAC module 135. Therefore, in embodiments the EWTM is the location of the interface with the conventional system. EWTM 140 output is input to Countermeasure Synthesis (CS) 145 to select a countermeasure for an identified radar or waveform that is either 1) not in the emitter database, or 2) the technique that is present in the emitter database is not wanted. CS 145 output is input to ECM Arbitration 150. ECM technique lookup 135 also provides input to ECM Arbitration 150. ECM Arbitration 150 handles conflict between the conventional and cognitive paths, 130 and 145, to ensure that the correct techniques are selected for the radars, and that resources are managed appropriately. ECM Arbitration 150 output is input to Countermeasure Effectiveness Assessment (CEA) 155. SAC 135 also provides input to CEA 155 for CEA to evaluate how well an ECM is doing against a radar by observing how the radar responds to the ECM in real time. SAC 135, CS 145, and CEA 155 provide input to Cognitive EW storage 160. EWTM 140, ECM Arbitration 150, and CEA 155 provide input to Platform Systems 165 for potential fusion and use in combination with other sensors of platform tasks. Platform Systems 165 also provide input to EWTM 140 and ECM Arbitration 150. CEA 155 also provides input to CS 145. SAC 135 isolates and characterize advanced and unknown radars through online analysis of detected pulses and inference on what that means for emitters and waveforms. Aspects of EWTM 140 merge/split tracks that differ between conventional ESM 120 and SAC 135. In embodiments this is accomplished by comparing the outputs of the two systems and determining if one system is over-fracturing tracks, and they should be grouped back together as indicated by the other system or, conversely, if one system is grouping too many tracks together and should be splitting them apart as indicated by the other system. CS 145 designs ECM responses for unknown threats, while CEA 155 assesses ECM effectiveness to feedback to CS 145 for closed-loop ECM. In embodiments this is accomplished by monitoring how the threats evolve in real-time, taking into context the ECM that is deployed. As previously described, ECM Arbitration 150 therefore mitigates and resolves ECM differences between the conventional ECM Technique Lookup 135 and Cognitive EW CS 145. Platform Systems 165 connects the EW system with other sensors and systems on the platform.

Figure 2:
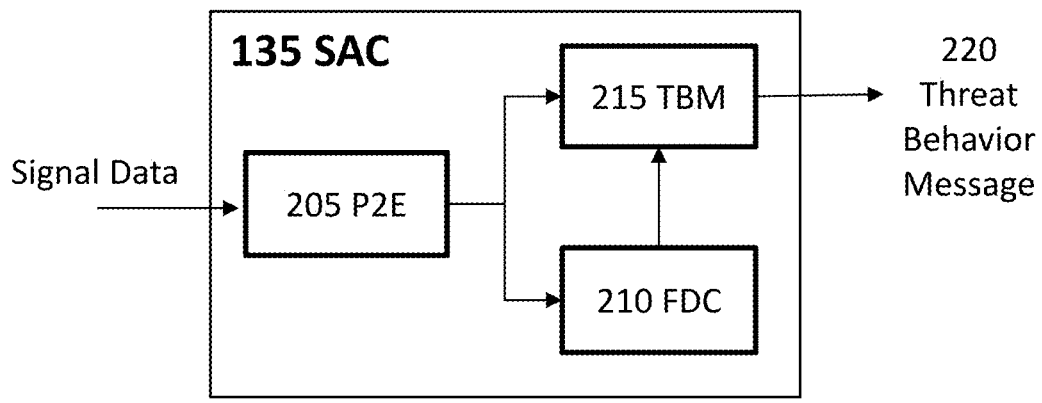
FIG. 2 depicts details of SAC and EWTM modules configured in accordance with an embodiment.
Figure 2:
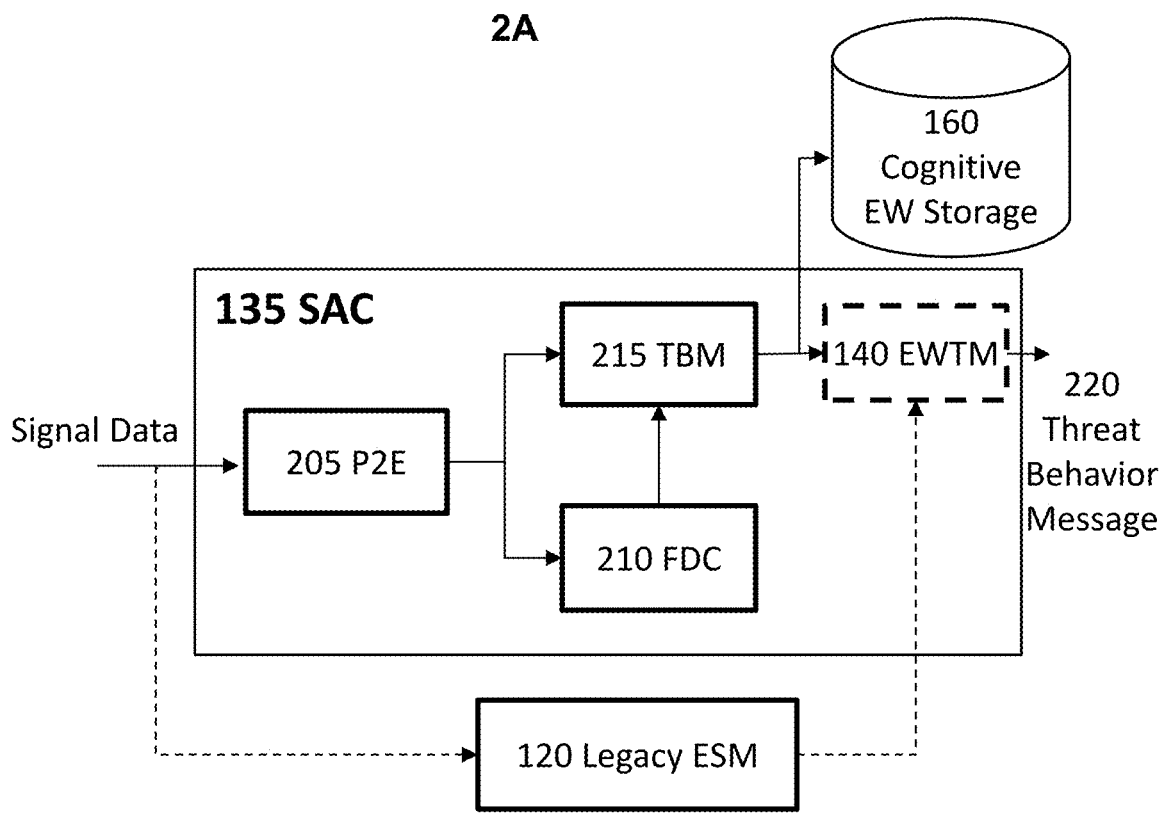

FIG. 2 depicts details of SAC 135 and EWTM 140 modules 200. Module embodiments 2A use data-driven machine learning which, in embodiments, utilizes unsupervised clustering of pulse detection data to build individual emitter models to identify the emitters present in the RF environment from input Signal Data (completely independent of any emitter database), and isolate them into pulse streams for each emitter by Pulse to Emitter (P2E) Association 205. Embodiments use data-driven machine learning to de-interleave the radar functions (behaviors) for each emitter and identify the mode and intent of each (completely independent of any emitter database) by Function De-interleaving Classifier (FDC) 210. In embodiments, de-interleaving the radar functions is performed by real-time inference of radar behaviors in the context of the physics of the radio frequency domain through discrete and continuous parametric and non-parametric modeling. Embodiments track changes in behaviors to enable continual updates to CS & CEA functions (described below) Threat Behavior Modeling (TBM) 215 outputs Threat Behavior Message 220. Module embodiments 2B operate similarly to embodiments 2A. However, they add processing of input Signal Data by Legacy ESM 120 to provide additional input to ETWM 140.

Then, embodiments fuse SAC emitter tracks with baseline (database) emitter tracks to identify and merge War Reserve Modes (WRM) for known emitters, split baseline clustered tracks, and complete mode and intent (characterization) for unknown tracks (EWTM) 140. ETWM 140 outputs Threat Behavior Message 220 to Platform Systems, CS, and CEA. Additionally, TBM 215 output is saved in Cognitive EW Storage 160. In embodiments, TBM processes legacy ESM signal data much in the same way it processes its own data streams, since both have the same detected pulse format; thus no special extensions are needed. In embodiments, the SAC emitter tracks are fused based on the statistical similarity between the properties of the waveforms and the supporting confidence in that similarity, which may be temporal in nature. As previously mentioned, TBM performs real-time inference to understand the physics properties of radars and waveforms in order to model the characteristics and functionality of the radar.

In embodiments, messages comprise object oriented attributes with hierarchies of information and details rather than simple text or numerical exchanges.

Figure 3:
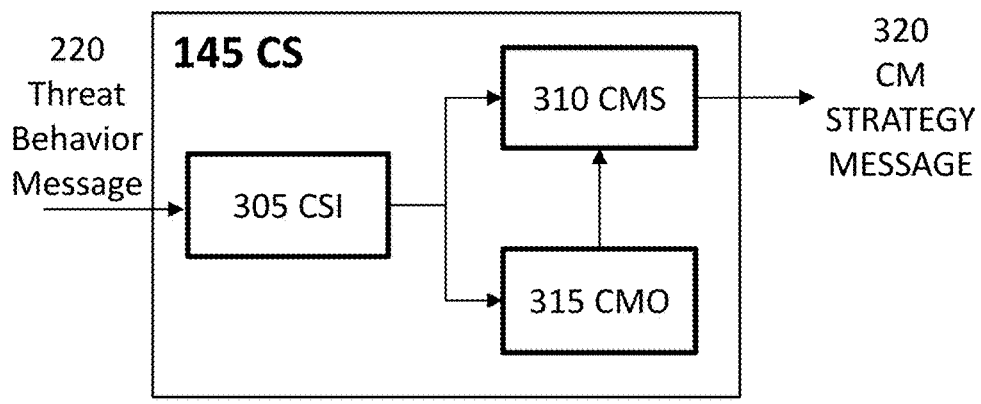
FIG. 3 depicts details of CS (Countermeasure Synthesis module) and ECM Arbitration modules configured in accordance with an embodiment.
Figure 3:
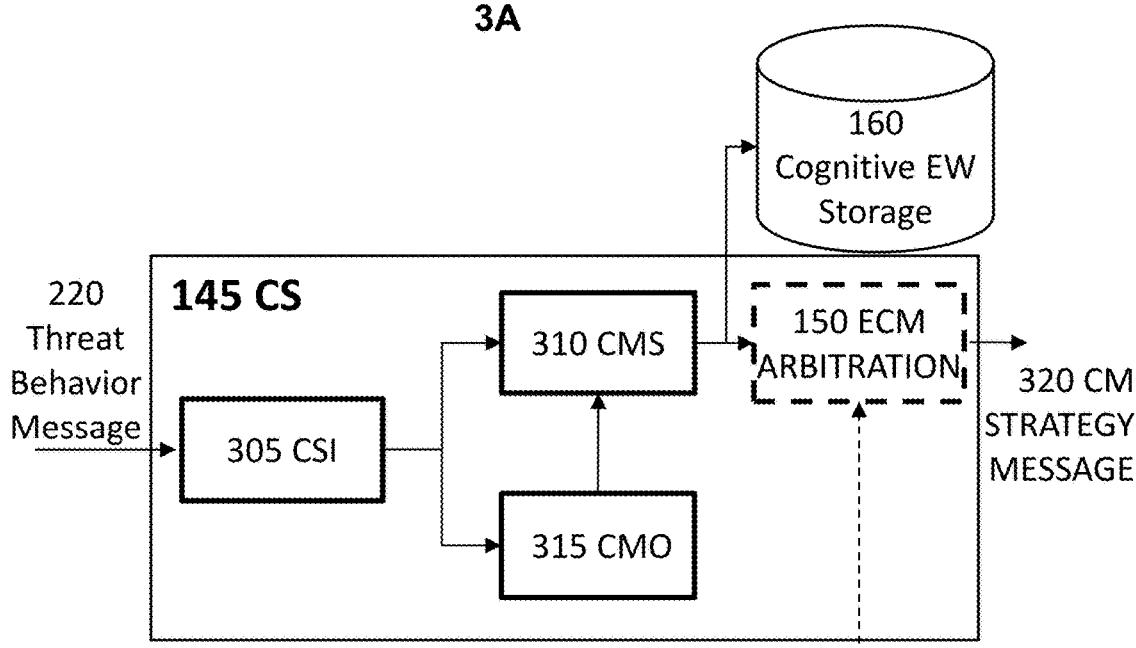

FIG. 3 depicts details of Countermeasure Synthesis (CS) 145 and ECM Arbitration 150 modules 300. Embodiments use the characterization from SAC 135 and a data-driven machine learning algorithm (fed from CEA 155 below) to select the best Electronic Countermeasures (ECM) to apply to each emitter (Countermeasure Selection). Embodiments determine the level of threat for each emitter, and prioritize emitters to decide upon jamming responses (Capability, Severity, and Intent). Then, embodiments parameterize ECM based on the observed threat behaviors (Countermeasure Optimization). In module embodiment 3A, Threat Behavior Message 220 is input to Capability, Severity, and Intent (CSI) module 305 of Countermeasure Synthesis (CS) 145. CSI 305 output then provides input to both Countermeasure Selection (CMS) 310 and Countermeasure Optimization (CMO) 315. CMS 310 outputs CM Strategy Message 320. Module embodiments 3B operate similarly to embodiments 3A. However, similar to FIG. 2, they add processing by Legacy ESM Technique Lookup 130 to provide additional input to ECM Arbitration 150 which receives input from CMS 310. ECM Arbitration 150 outputs CM Strategy Message 320 to Platform Systems, CEA, and Resource Manager. Additionally, CMS 310 output is saved in Cognitive EW Storage 160.

Figure 4:
FIG. 4 depicts details of a CEA module configured in accordance with an embodiment.
Figure 4:
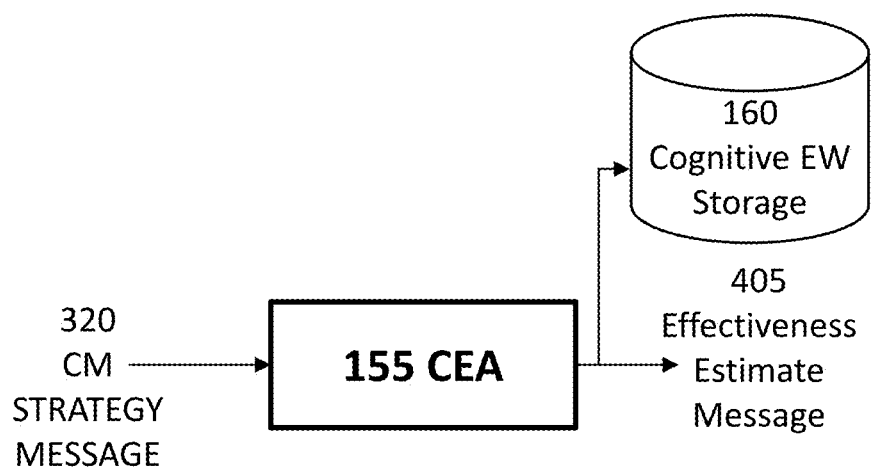

FIG. 4 depicts details of CEA 155 module 400. Embodiments compare observable radar response(s) (through continued SAC operation) to expected responses from employed ECM(s) to compute an estimate of ECM effectiveness. The ECM effectiveness processes the input data to determine the most appropriate ECM option that is an available resource. An estimate of ECM effectiveness is an online (real-time) calculation of the likelihood that a deployed countermeasure is being effective against a radar, purely through observables that are available over the air.

Embodiments then provide the feedback to CS 145 to enable adaptive radar countermeasures. In module embodiment 4A, CM Strategy Message 320 is input to CEA 155. CEA 155 outputs Effectiveness Estimate Message 405. Module embodiments 4B operate similarly to embodiments 4A. However, similar to FIGS. 2 and 3, they include saving CEA 155 output to Cognitive EW Storage 160. CEA 155 output is sent to CS and Platform System 165.

Figure 5:
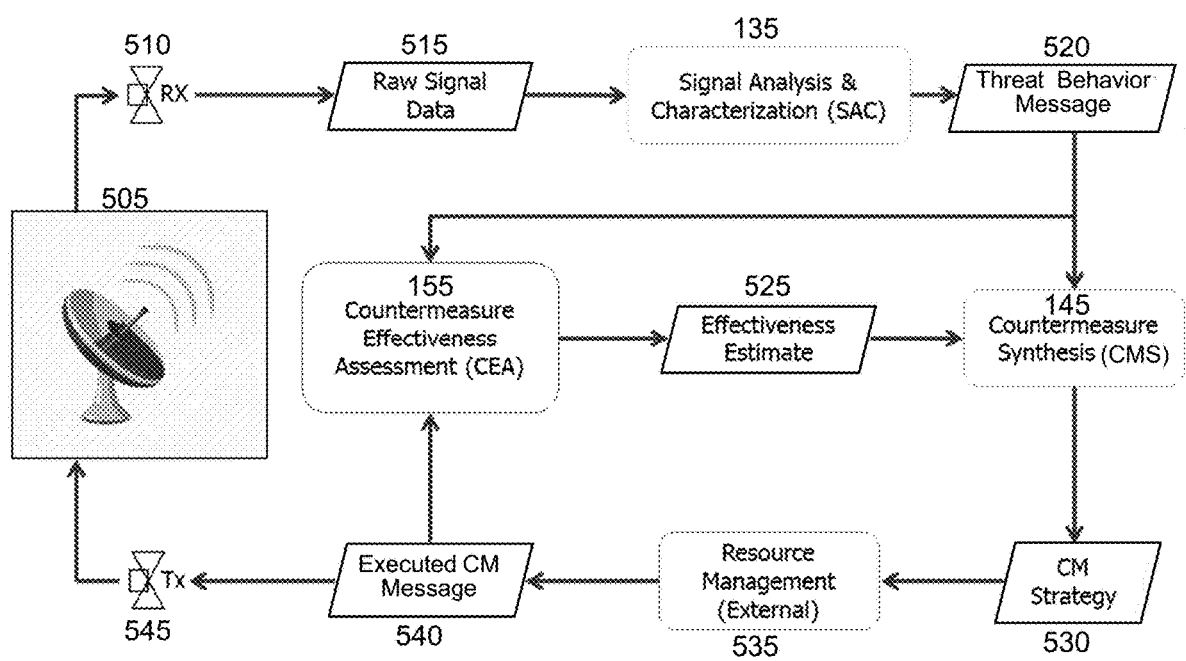
FIG. 5 depicts details of a Cognitive EW functional architecture configured in accordance with an embodiment.

FIG. 5 depicts Cognitive EW functional architecture 500. Components comprise radar threat 505 signals being received by EW receiver 510. EW receiver 510 outputs raw signal data 515. Raw signal data 515 is input to Signal Analysis and Characterization (SAC) 135. SAC 135 outputs threat behavior message(s) 520. Threat behavior message(s) 520 is/are input to Countermeasures Synthesis (CS) 145 and Countermeasures Effectiveness Assessment (CEA) 155. CS evaluates the threats passed from SAC and chooses or updates countermeasures to use against those threats. CEA monitors how well a currently deployed countermeasure is doing against a radar threat to prove a real-time assessment that can be used to assess success and update strategy. CEA 155 outputs Effectiveness Estimate(s) 525. An Effectiveness Estimate is a value the system calculates to determine if a countermeasure is effective or not. Effectiveness Estimate(s) 525 is/are a second input to CS 145. CS 145 outputs CM Strategy 530. CM Strategy 530 is input to Resource Management (external) 535. Resource Management 535 outputs the Executed Counter Measures (CM) message 540. Executed CM message 540 is input to both CEA 155 and the EW transmitter 545. Executed CM message 540 contains all the information to actually execute the countermeasure. CS populates several of the fields of the message with parameter values that it deems are good candidates for constructing an effective countermeasure. EW transmitter 545 transmits the selected countermeasures back to radar threat 505.

Figure 6:
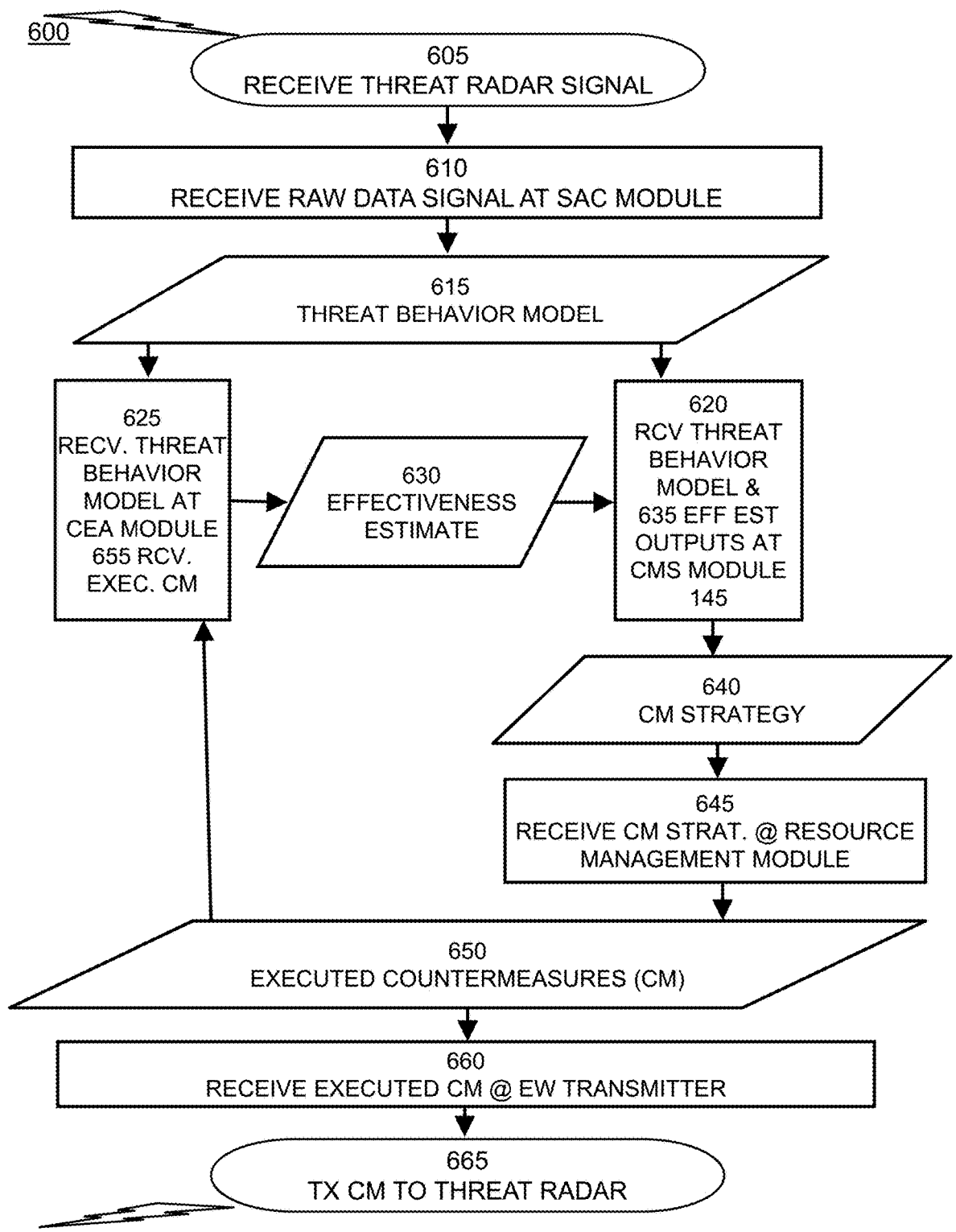
FIG. 6 is a Cognitive EW method flowchart configured in accordance with an embodiment.

FIG. 6 is a Cognitive EW method flowchart 600. In one embodiment the EW receiver on an asset receives a signal from a threat radar 605. The EW receiver outputs a raw signal data to a Signal Analysis and Characterization (SAC) module 610. The SAC module outputs a Threat Behavior Message (TBM) 615 from the SAC to a Countermeasures Synthesis (CS) module 620 and a Countermeasures Effectiveness Assessment (CEA) module 625.

The Countermeasures Effectiveness Assessment (CEA) module processes the Threat Behavior Message 625 and outputs an Effectiveness Estimate 630.

The CEA module receives the Effectiveness Estimate at said CS module 635.

The CS module outputs a CM Strategy 640 that identifies a solution for the threat.

Receiving said CM Strategy at a Resource Management module 645; outputting an Executed Counter Measures (CM) 650 from said Resource Management module; receiving the Executed CM at the CEA module 655; sending said Executed CM to an EW transmitter 660; and transmitting countermeasures back to threat radar 665.

In embodiments, hardware for the Cognitive EW system comprises at least one antenna that captures wireless RF signals and directs them to receiver electronics that may include a preamplifier and digitizer, as well as a digital filter and a digital downconverter configured to eliminate the carrier frequency of the detected RF and to convert the detected RF to baseline. Embodiments include a Signal Analysis and Characterization (SAC) module that uses data-driven machine learning to separate (de-interleave) and isolate from each other the radar-emitted waveforms that are present in the RF environment, and, in embodiments, associates each of the hostile waveforms with the radar from which it is being emitted. In embodiments, CSI later determines intent, including hostility.

The computing system used for radar electronic warfare (EW) countermeasures for performing (or controlling) the operations or functions described hereinabove with respect to the system and/or the method may include a processor, FPGA, I/O devices, a memory system, and a network adaptor. The computing system includes a program module (not shown) for performing (or controlling) the operations or functions described hereinabove with respect to the system and/or the method according to exemplary embodiments.

For example, the program module may include routines, programs, objects, components, logic, data structures, or the like, for performing particular tasks or implement particular abstract data types. The processor may execute instructions written in the program module to perform (or control) the operations or functions described hereinabove with respect to the system and/or the method. The program module may be programmed into the integrated circuits of the processor. In an exemplary embodiment, the program module may be stored in the memory system or in a remote computer system storage media.

The computing system may include a variety of computing system readable media. Such media may be any available media that is accessible by the computer system, and it may include both volatile and non-volatile media, removable and non-removable media.

The memory system can include computer system readable media in the form of volatile memory, such as random access memory (RAM) and/or cache memory or others. The computer system may further include other removable/non-removable, volatile/non-volatile computer system storage media. The computer system can communicate with one or more devices using the network adapter. The network adapter may support wired communications based on Internet, LAN, WAN, or the like, or wireless communications based on CDMA, GSM, wideband CDMA, CDMA-2000, TDMA, LTE, wireless LAN, Bluetooth, or the like.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++ or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to a flowchart illustration and/or block diagram of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The foregoing description of the embodiments has been presented for the purposes of illustration and description. It is not intended to be exhaustive or to limit the invention to the precise form disclosed. Many modifications and variations are possible in light of this disclosure. It is intended that the scope of the present disclosure be limited not by this detailed description, but rather by the claims appended hereto.

A number of implementations have been described. Nevertheless, it will be understood that various modifications may be made without departing from the scope of the disclosure. Although operations are depicted in the drawings in a particular order, this should not be understood as requiring that such operations be performed in the particular order shown or in sequential order, or that all illustrated operations be performed, to achieve desirable results.

Each and every page of this submission, and all contents thereon, however characterized, identified, or numbered, is considered a substantive part of this application for all purposes, irrespective of form or placement within the application. This specification is not intended to be exhaustive or to limit the invention to the precise form disclosed. Many modifications and variations are possible in light of this disclosure. Other and various embodiments will be readily apparent to those skilled in the art, from this description, figures, and the claims that follow. It is intended that the scope of the invention be limited not by this detailed description, but rather by the claims appended hereto.

What is claimed is:

1. A closed loop real-time cognitive Electronic Warfare (EW) system comprising:
    an EW receiver for receiving radar threat signals from a threat radar and providing raw signal data;
    a Signal Analysis and Characterization (SAC) module receiving the raw signal data, the SAC module comprising:
        a Pulse to Emitter Association (P2E) sub-module for identifying emitters and isolating pulses for at least one emitter;
        a Function De-interleaving Classifier (FDC) sub-module that de-interleaves radar function behaviors for the emitter;
        a Threat Behavior Model (TBM) sub-module tracking changes in radar behaviors;
        an EW Track Manager (EWTM) sub-module comprising:
            an unsupervised machine learning algorithm configured to cluster pulse detection data and build individual emitter models or emitters present in an RF environment completely independent of any emitter database;
            wherein the SAC module outputs a Threat Behavior Model message;
    a Countermeasures Synthesis (CS) module receiving the Threat Behavior Model message and outputting a CounterMeasure (CM) Strategy message, the CS module comprising:
        a Capability, Severity, and Intent (CSI) sub-module determining a level of threat for each emitter;
        a Countermeasure Selection (CMS) sub-module selecting one or more electronic countermeasures;
        a Countermeasure Optimization (CMO) sub-module parameterizing at least one of the electronic countermeasures;
    an EW transmitter;
    a Countermeasures Effectiveness Assessment (CEA) module receiving the Threat Behavior Model message, the CM Strategy message and outputting an Effectiveness Estimate message, the CEA comprising:
    a Resource Management module receiving the CM Strategy message and outputting an Executed CounterMeasure (CM) message to the EW transmitter;
        wherein the EW transmitter is configured to transmit at least one countermeasure to the threat radar; and
        wherein said Function De-interleaving Classifier sub-module comprises:
    data-driven machine learning de-interleaves radar function behaviors for each emitter and identifies a mode and intent of each completely independent of any emitter database, wherein the de-interleaving is performed by real-time inference of radar behaviors in the context of the physics of the radio frequency domain through discrete and continuous parametric and non-parametric modeling; and
    said Threat Behavior Modeling sub-module comprises:
    tracking changes in behaviors to enable continual updates to functions of said CS module and said CEA module.

2. The system of claim 1 wherein said Pulse to Emitter Association sub-module comprises: data-driven machine learning identifying emitters present in an RF environment and isolating them into pulse streams for each emitter.

3. The system of claim 1 wherein an EW Track Manager (EWTM) module comprises:
    fusing SAC emitter tracks with conventional EW ESM emitter tracks to identify and merge War Reserve Modes (WRM) for known emitters, splitting baseline clustered tracks, and completing mode and intent characterization for unknown tracks and waveforms.

4. The system of claim 1 wherein said Countermeasures Synthesis CS module comprises:
    using a characterization from said SAC and a data-driven machine learning algorithm.

5. The system of claim 1 wherein said Countermeasures Synthesis CS module comprises:
    using a characterization from said SAC module and a data-driven machine learning algorithm fed from said CEA module.

6. The system of claim 1 wherein said Countermeasure Selection sub-module comprises:
    a characterization from said SAC and a data-driven machine learning algorithm to select at least one best Electronic Countermeasure (ECM) to apply to each emitter.

7. The system of claim 1 wherein said Capability, Severity, and Intent sub-module comprises:
  determining a level of threat for each emitter to decide upon jamming responses.

8. The system of claim 1 wherein ECM arbitration modules comprise:
  mitigation; and
  resolving ECM differences between a conventional ECM system and said Cognitive EW System from said Countermeasures Synthesis CS.

9. The system of claim 1 wherein said Countermeasures Synthesis CS module comprises:
  said countermeasure optimization sub-module wherein ECM is parameterized based on observed threat behaviors.

10. The system of claim 1 wherein said CEA module comprises:
  comparing at least one observable threat response to expected responses from employed at least one said ECM to compute an estimate of ECM effectiveness.

11. The system of claim 1 wherein said CEA module comprises:
  comparing at least one observable threat response to expected responses from employed at least one said ECM to compute an estimate of ECM effectiveness is through continued operation of said SAC module.

12. The system of claim 1 wherein said CEA module comprises:
  providing feedback to said Countermeasures Synthesis CS module to enable adaptive radar countermeasures.

13. A method for closed loop real-time cognitive Electronic Warfare (EW) comprising:
  receiving a signal from a threat radar by an EW receiver;
  receiving raw signal data at a Signal Analysis and Characterization (SAC) module;
  identifying, by an unsupervised machine learning algorithm configured to cluster pulse detection data and build individual emitter models or emitters present in an RF environment, emitters present in an RF environment;
  outputting a Threat Behavior Model message relating to an identified emitter from said SAC module;
  receiving said Threat Behavior Model message at a Countermeasures Synthesis (CS) module;
  receiving said threat behavior message at a Countermeasures Effectiveness Assessment (CEA) module;
  outputting an Effectiveness Estimate message from said CEA module;
  receiving said Effectiveness Estimate message at said CS module;
  outputting a CM Strategy message from said CS module;
  receiving said CM Strategy message at a Resource Management module;
  outputting an Executed Counter Measures (CM) message from said Resource Management module;
  receiving said Executed CM message at said CEA module;
  sending said Executed CM message to an EW transmitter;
  transmitting countermeasures back to said threat radar;
  processing by a Function De-interleaving Classifier (FDC) sub-module wherein the FDC sub-module de-interleaves by real-time inference of radar behaviors in the context of the physics of the radio frequency domain through discrete and continuous parametric and non-parametric modeling for each emitter completely independent of any emitter database.

14. The method of claim 13 wherein said method comprises:
  processing by the Function De-interleaving Classifier (FDC) sub-module wherein data-driven machine learning identifies a mode and intent of each emitter completely independent of any emitter database.

15. The method of claim 13 wherein said method comprises:
  a Threat Behavior Model sub-module wherein it tracks changes in behaviors to enable continual updates to CS and CEA functions by outputting a Behavior Module Threat messenger.

16. The method of claim 13 wherein said method comprises:
  a Countermeasure Selection sub-module comprising a characterization from said SAC and a data-driven machine learning algorithm to select at least one best Electronic Countermeasure (ECM) to apply to each emitter.

* * * * *